United States Patent [19]

Hartz et al.

[11] Patent Number: 4,563,913

[45] Date of Patent: Jan. 14, 1986

[54] SIDE-BY-SIDE ENGINE AND TRANSMISSION ASSEMBLY

[75] Inventors: James F. Hartz, Indianapolis; Harry E. Latshaw, Danville, both of Ind.

[73] Assignee: General Motors Corporation, Detroit, Mich.

[21] Appl. No.: 626,441

[22] Filed: Jun. 29, 1984

[51] Int. Cl.[4] .............................................. F16H 57/02
[52] U.S. Cl. .................................... 74/606 R; 74/329
[58] Field of Search .............. 74/329, 369, 377, 606 R

[56] References Cited

U.S. PATENT DOCUMENTS

| | | | |
|---|---|---|---|
| 861,488 | 7/1907 | Waters | 74/606 R X |
| 2,164,096 | 6/1939 | Tjaarda | 180/54 |
| 2,164,097 | 6/1939 | Tjaarda | 180/1 |
| 2,448,354 | 8/1948 | Aronson | 180/70 |
| 2,854,085 | 9/1958 | Bachle | 180/66 |
| 3,504,563 | 4/1970 | Polak | 74/405 |
| 3,504,564 | 4/1970 | Kell | 74/405 |
| 3,636,795 | 1/1972 | Maurice et al. | 74/606 R |
| 3,703,107 | 11/1972 | Piret | 74/606 R X |
| 3,958,655 | 5/1976 | Kronogárd | 180/66 A |
| 4,193,322 | 3/1980 | Morino et al. | 74/606 R X |
| 4,223,567 | 9/1980 | Onda | 74/606 R |
| 4,242,923 | 1/1981 | Nishikawa et al. | 74/606 R X |

Primary Examiner—Leslie A. Braun
Assistant Examiner—Dwight G. Diehl
Attorney, Agent, or Firm—Saul Schwartz

[57] ABSTRACT

In a side-by-side engine and transmission assembly wherein the engine has a block defining a primary rotating group axis and the transmission has a drive output axis and a power input axis parallel thereto and laterally spaced therefrom, a connection between the engine and transmission includes a transfer case attached to the engine generally amidships thereof defining an engine power output axis parallel to and spaced from the primary rotating group axis, a pair of trunnions on the transfer case aligned on the engine power output axis, a pair of saddles on the transmission aligned on the transmission input axis, the trunnions being received in the saddles to connect the engine to the transmission with the engine power output and transmission power input axes coinciding, drive shaft means aligned on the coincident axes to conduct engine power from the transfer case to the transmission, and a torque reaction control connection between the engine and transmission remote from the coincident axes.

4 Claims, 7 Drawing Figures

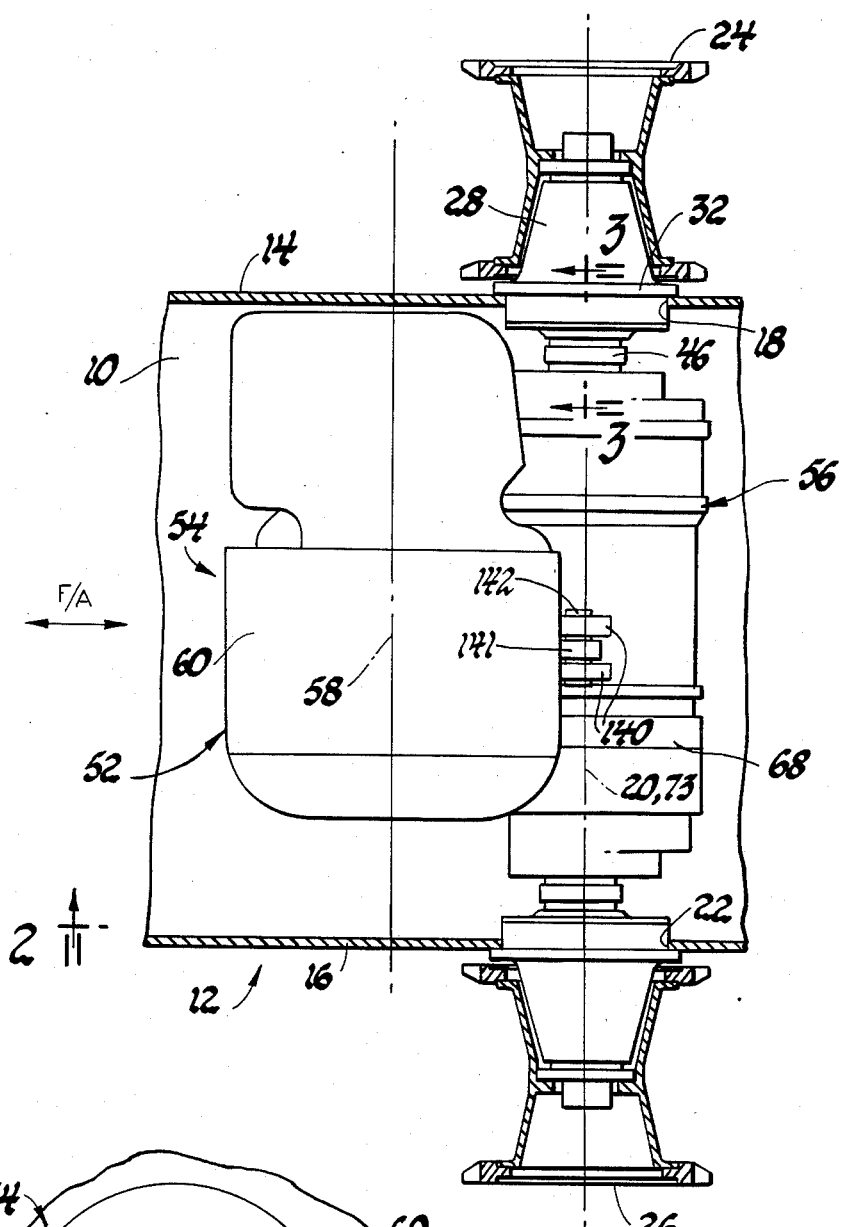
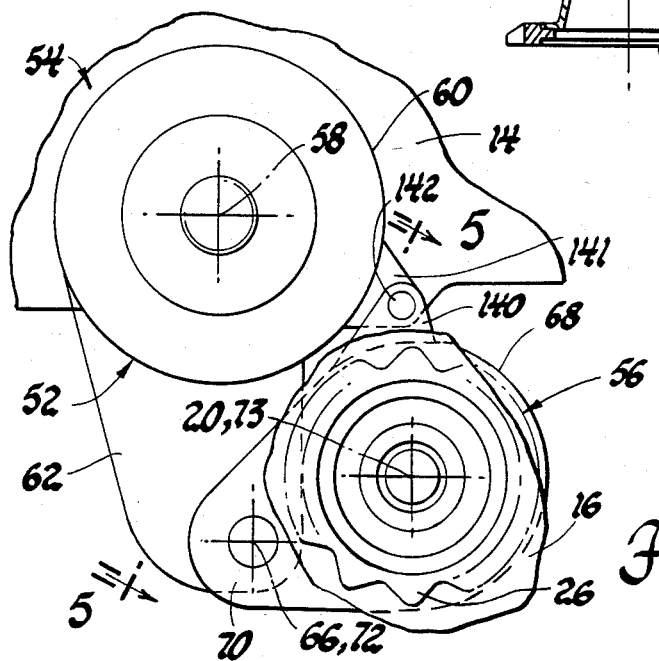
Fig.1
Fig.2

SIDE-BY-SIDE ENGINE AND TRANSMISSION ASSEMBLY

The invention herein described was made in the course of work under a contract or subcontract thereunder with the Department of Defense.

BACKGROUND OF THE INVENTION

1. Field of the Invention

This invention relates generally to engine and transmission assemblies as used, for example, in track laying vehicles and, more particularly, to a new and improved side-by-side engine and transmission assembly.

2. Description of the Prior Art

Efforts to conserve space in wheeled or track laying vehicles have led to power train proposals wherein the engine and the transmission are oriented transversely in side-by-side fashion. In such installations, torque must be transferred in the vehicle fore and aft direction from the engine to the transmission and alignment therebetween must be rigidly maintained to avoid abnormal component wear. Heretofore alignment and rigidity have been provided by transfer case type housings bolted to the ends of the engine and the transmission. A new and improved engine and transmission assembly according to this invention includes an amidships transfer case and an attachment arrangement which provides a compact assembly with requisite alignment and rigidity capability.

SUMMARY OF THE INVENTION

Accordingly, the primary feature of this invention is that it provides a new and improved engine and transmission assembly wherein the engine and transmission are arranged in transverse side-by-side fashion and power is transferred fore and aft generally near the vehicle centerline. Another feature of this invention resides in the provision in the new and improved assembly of trunnions on an amidship transfer case portion of the engine block aligned on a power output axis of the engine parallel to and laterally spaced from a primary rotating group axis of the engine and a pair of saddles on the transmission aligned on a power input axis of the transmission parallel to and laterally spaced from a drive output axis of the transmission, the trunnions being journaled on the saddles to connect the engine to the transmission with the engine output and transmission input axes in permanent alignment. Still another feature of this invention resides in the provision in the new and improved assembly of a retractable intermediate shaft mounted in the trunnions for rotation about the coincident engine output and transmission input axes and operative to transfer torque from the engine to the transmssion, the intermediate shaft being retractable to an inactive position severing the power path between the engine and transmission to facilitate mating and separation of the engine and transmission.

These and other features of this invention will be readily apparent from the following specification and from the drawings wherein:

FIG. 1 is an environmental plan view of a portion of a track laying vehicle having an engine and transmission assembly according to this invention;

FIG. 2 is a schematic elevational view taken generally along the plane indicated by lines 2—2 in FIG. 1;

Figure 7:
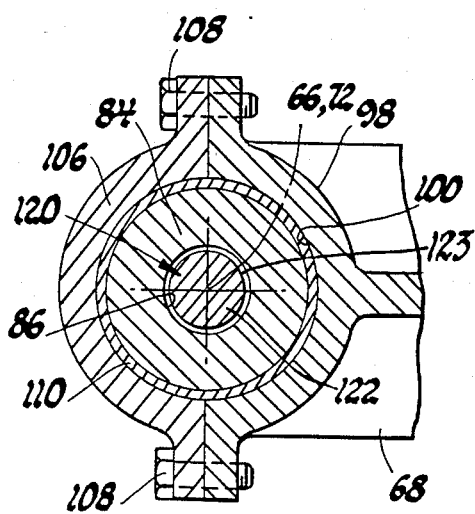
Figure 6:
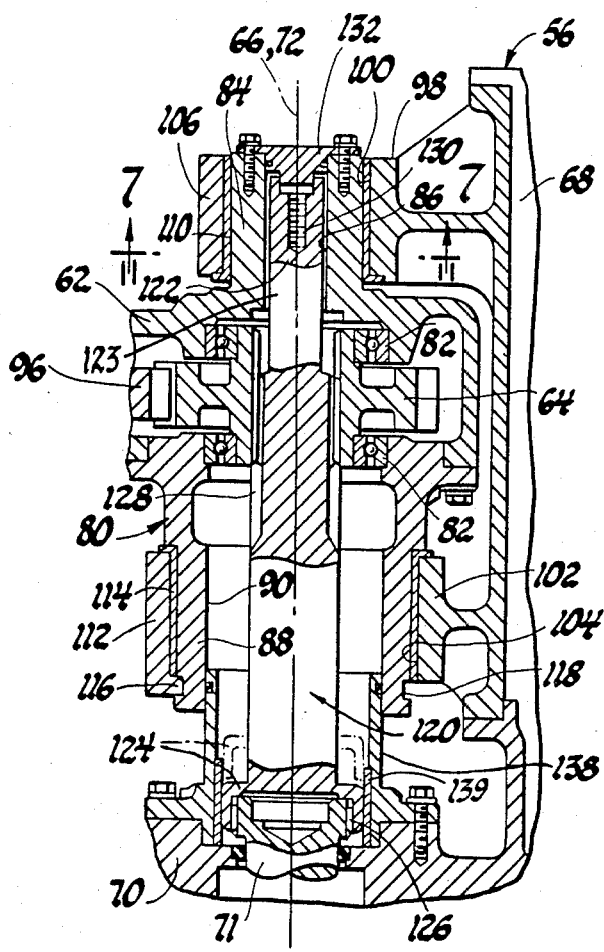
FIG. 6 is an enlarged broken away view of a portion of FIG. 5.

FIG. 7 is a sectional view taken generally along the plane indicated by lines 7—7 in FIG. 6. Referring now to FIG. 1 of the drawings, a compartment of a track laying vehicle 12 is illustrated in plan view with the fore and aft direction of the vehicle identified by the arrow F/A. The compartment 10 is defined on opposite lateral sides by a vertical hull wall 14 and a vertical hull wall 16. In the fore and aft direction, the compartment 10 is defined by a pair of vertical bulkheads, not shown, extending between the hull walls 14 and 16. Hull wall 14 has an aperture 18 aligned on a transverse axis 20 of the vehicle, the hull wall 16 having a similar aperture 22 aligned on the axis 20.

Figure 3:
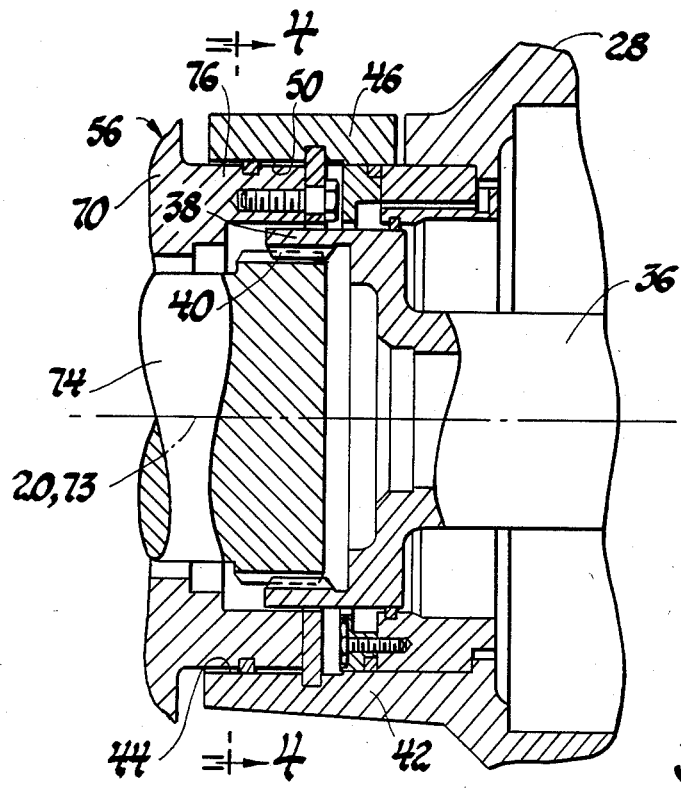
FIG. 3 is an enlarged sectional view taken generally along the plane indicated by lines 3—3 in FIG. 1.
Figure 4:
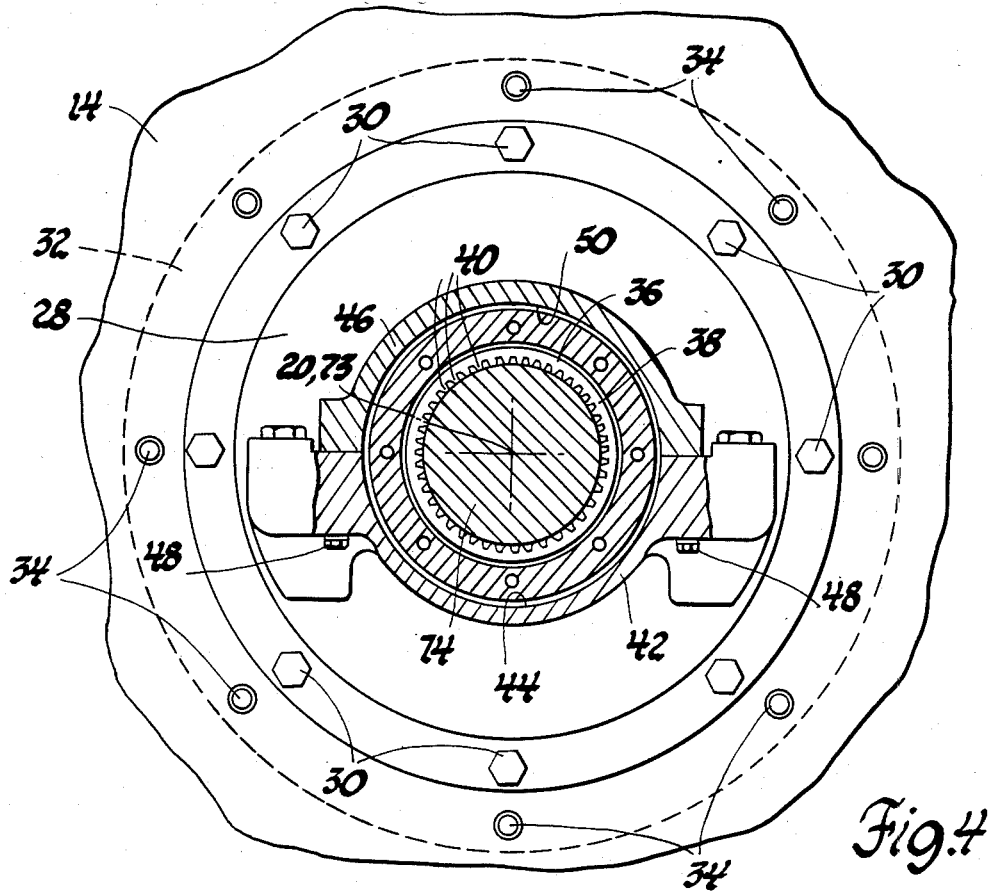
FIG. 4 is a sectional view taken generally along the plane indicated by lines 4—4 in FIG. 3.

As seen best in FIGS. 1, 3 and 4, a pair of final drive and sprocket assemblies 24 and 26 are disposed in the apertures 18 and 22 in the hull walls 14 and 16, respectively. Describing only the salient features of assembly 24, assembly 26 being identical, the former includes a housing 28 having inner and outer halves fastened by an annular array of bolts 30. A flange 32, FIG. 1, abuts the outside surface of hull wall 14 and is rigidly attached thereto by an annular array of bolts 34 whereby the drive and sprocket assembly 24 is rigidly attached to the vehicle and aligned on transverse axis 20. A drive shaft 36, FIGS. 3 and 4, rotatably supported on the housing 28, is shiftable along the transverse axis 20 between a retracted position, not shown, and an extended position, FIG. 3, and includes a ring gear portion 38 having a plurality of internal gear teeth 40. The housing 28 has a lower lip 42 defining an upwardly facing semi-cylindrical surface 44 aligned on axis 20 inboard of the hull wall 14. A cap 46 is bolted to the lip 42 by a plurality of bolts 48 and includes a semi-cylindrical surface 50 which cooperates with the surface 44 on the lip in defining an unbroken, internal cylindrical surface.

The final drive and sprocket assemblies 24 and 26 cooperate with an engine and transmission assembly 52 according to this invention disposed within the compartment 10. The assembly 52 includes an engine 54 and a transmission 56. In the embodiment illustrated, the engine 54 is a gas turbine engine having a primary rotating group, consisting generally of a gasifier turbine and compressor and a power turbine, rotatable about an axis 58 of the engine. The internal structure and operation of the engine 54 forms no part of this invention except to the extent that the engine includes a rigid external housing or block 60 having a rigid, amidships transfer case portion 62, FIGS. 2, 5 and 6, projecting perpendicular to the primary rotating group axis 58 generally at the center of the engine 54. The transfer case portion 62 houses transfer gearing operative to transfer rotary power from the primary rotating group to an output gear 64 on the transfer case portion rotatable about an axis 66 parallel to axis 58. While the illustrated engine 54 is a gas turbine engine, it might also be a conventional internal combustion engine wherein the primary rotating group includes a crankshaft rotatable about an axis corresponding to the axis 58 and a transfer case similar to transfer case portion 62 provides rotary power output at an axis parallel to but displaced from the primary rotating group axis. The transmission has a generally cylindrical housing 68 with an offset portion 70. An input gear 71 of the transmission, FIG. 6, is supported on the offset portion 70 for rotation about an input axis 72 of the transmission. Rotary power input to the input gear is transferred and multiplied within the transmission and delivered to a pair of output gears aligned on an output axis 73 of the transmission at opposite ends of the latter, only a single output gear 74 being illustrated in FIG. 3. The output axis 73 is parallel to and offset from the input axis 72. A pair of cylindrical diameters 76 and 78, FIG. 5, on opposite ends of the transmission housing are aligned on the axis 73 for supporting the transmission on the hull walls as described hereinafter.

Referring particularly now to FIGS. 2 and 5 through 7, the transfer case portion 62 has a T-shaped end 80 in which output gear 64 is supported by a pair of bearings 82 for rotation about the axis 66. The T-shaped end 80 defines a small cylindrical trunnion 84 with a bore 86 therethrough and a large cylindrical trunnion 88 with a bore 90 therethrough. Both trunnions and both bores are aligned on the axis 66. A transfer gear 96, rotatably supported in the transfer case portion 62, meshes with the output gear 64 and delivers engine output power thereto. The transmission housing 68 has a small saddle 98 rigidly formed thereon with a semi-cylindrical surface 100 aligned on the input axis 72. Similarly, the transmission housing 68 has a large saddle 102 formed thereon with a semi-cylindrical surface 104 aligned on the axis 72. A small cap 106 captures the small trunnion 84 and is fastened to the small saddle 98 by a plurality of bolts 108 with a sleeve bearing 110 between the cap and saddle and the trunnion. Similarly, a large cap 112 captures the large trunnion 88 and is bolted to the large saddle 102 with a sleeve bearing 114 between the cap and saddle and the trunnion. In the event that the transmission housing 56 is constructed of non-ferrous metal, such as aluminum, the sleeve bearings 114 and 110 are relatively harder to minimize wear and/or handling damage. With the trunnions captured between the caps and saddles, axes 66 and 72 are coincident. An inturned flange 116 on the large cap 112 is received in a continuous annular groove 118 at the outboard end of large trunnion 88 whereby the transfer case portion 62 is laterally located relative to the transmission housing. Alternatively, lateral location could be assured through engagement of the flanges on the sleeve bearings 110 and 114 on appropriate shoulders on the T-shaped end 80.

Referring particularly to FIG. 6, a retractable intermediate shaft 120 is disposed within the T-shaped end 80 of the transfer case portion 62 and includes a first end 122 having an outer cylindrical surface 123 rotatable in the bore 86 with clearance relative thereto and a second end 124 defining an internal ring gear 126. Between the first and second ends 122 and 124, the intermediate shaft 120 has a plurality of external axial splines 128 slidably received in corresponding internal splines in a bore through output gear 64 whereby the intermediate shaft 120 is rotatable as a unit with the gear 64 about the coincident axes 66 and 72. In addition, the intermediate shaft is manually bodily shiftable along the coincident axes 66 and 72 between an active position, shown in solid lines in FIG. 6, meshing with transmission input gear 71 and an inactive position, partially shown in broken lines in FIG. 6, remote from the input gear by a bolt or other tool threaded into a bore 130 in the end of the intermediate shaft, the bore 130 normally being covered by a closure 132 bolted to the small trunnion 84. A cylindrical collar 138 bridges the gap between the offset portion 70 of the transmission and the large trunnion 88 on the transfer case portion 62 and is slidable in the bore 90 between a closed position, FIG. 6, bolted to the offset portion 70, and an open position, not shown, shifted rightwardly toward the large trunnion and exposing the second end 124 of the intermediate shaft 120. A bushing 139 in the collar 138 defines an internal cylindrical bearing surface supported on the T-shaped end 80 in which a corresponding outer cylindrical surface on the second end 124 of the intermediate shaft rotates.

Figure 5:
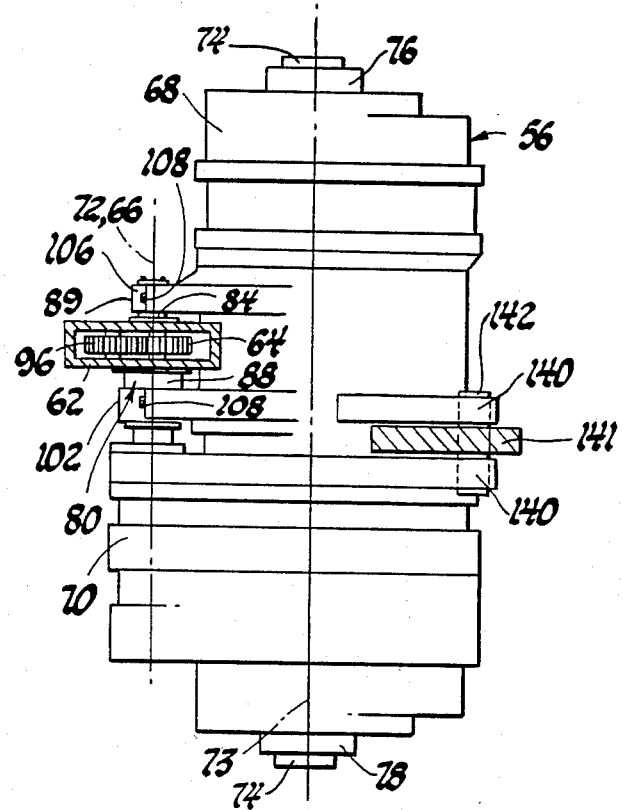
FIG. 5 is a fragmentary view taken generally along the plane indicated by lines 5—5 in FIG. 2.

To control the torque reaction between the engine 54 and the transmission 56 tending to rotate one relative to the other about coincident axes 66 and 72, any convenient form of connection remote from the coincident axes may be employed. For example, and as schematically illustrated in FIGS. 2 and 5, a pair of lugs 140 on the transmission housing 68 have an aperture spaced a predetermined radial distance from the axis 72. The engine block 60 has a similar aperture in a lug 141 at the same radial distance from the axis 66 which aperture registers with the aperture in the lugs 140 when the engine and transmission are rotated relative to each other about the coincident axes 66 and 72 to an assembled relationship. At that point, a pin 142 inserted in the registered apertures maintains the relative relationship between the engine and transmission. While only one remote connection is illustrated, a pair of such connections axially spaced on opposite sides of the transfer case portion 62 might also be resorted to for a more evenly balanced arrangement.

In a typical assembly sequence, the small and large caps 106 and 112, respectively, are initially removed from the saddles 98 and 102, the intermediate shaft 120 is retracted to the inactive position, and the collar 138 is in the open position. In this condition the engine is mated to the transmission by placement of the small and large trunnions 84 and 88, with the sleeves 110 and 114 thereon, into the saddles 98 and 102 respectively. Because the saddles 98 and 102 are aligned on axis 72 and the trunnions 84 and 88 are aligned on axis 66, placement of the trunnions on the saddles automatically brings axes 66 and 72 into coincidence. The caps 106 and 112 are placed over the trunnions and bolted to the saddles thereby attaching the engine to the transmission with only limited relative pivotal movement above the coincident axes 72 and 66 being possible. At this point in the assembly sequence the engine and transmission may be rotated relative to each other above the coincident axes 66 and 72 until pin 142 can be inserted in the registered apertures in the lugs on the transmission and the engine block. Finally, the intermediate shaft 120 is projected from the inactive to the active position wherein the internal ring gear 126 meshes with corresponding gear teeth on the transmission input gear 71 thereby completing the rotary power flow path from the engine to the transmission. With the intermediate shaft 120 then captured and maintained in the active position by the closure 132, the collar 138 is slid leftwardly, FIG. 6, to the closed position and bolted to the offset portion 70 of the transmission thereby completing attachment of the transmission to the engine.

With the final drive and sprocket assemblies 24 and 26 on the hull walls 14 and 16, respectively, the engine and transmission assembly is aligned transversely of the vehicle over the compartment 10 and lowered into the compartment until the cylindrical diameters 76 and 78 on opposite sides of the transmission housing contact the exposed semi-cylindrical surfaces on the final drive housings represented by surface 44 on final drive housing 28. The output shaft axis 73 of the transmission is then aligned on axis 20 of the vehicle and the drive shafts in the final drive assemblies, represented by shaft 36 in assembly 24, are projected to the extended positions wherein the internal gear teeth on the drive shafts engage the external gear teeth on the transmission output gears thereby connecting the transmission to the final drive and sprocket assemblies. The caps represented by cap 46 in assembly 24 are bolted to the lips represented by lip 42 in assembly 24 to restrain the transmission in the vertical direction. Finally, at a third mounting location, not shown, remote from the coincident axes 20 and 73, the engine and transmission assembly 52 is attached to the vehicle 12 for completing the mounting of the assembly on the vehicle.

The embodiments of the invention in which an exclusive property or privilege is claimed are defined as follows:

1. In an engine and transmission assembly including an engine having a block defining a primary rotating group axis and a transmission having a housing defining a drive output axis and a power input axis parallel thereto and laterally spaced therefrom, the combination comprising, transfer case means rigidly attached to said engine block generally amidships thereof defining an engine power output axis parallel to said primary rotating group axis and laterally spaced therefrom, means on one of said transfer case means and said transmission housing defining a pair of spaced trunnions aligned on the corresponding one of said engine power output and said transmission power input axes, means on the other of said transfer case means and said transmission housing defining a pair of axially spaced saddles aligned on the corresponding one of said engine power output and said transmission power input axes, respective ones of said trunnions being rotatably received in corresponding ones of said saddles so that said engine power output and said transmission power input axes coincide and said transmission housing is attached to said engine block for relative rotation about said coincident axes, intermediate drive means including a rotating shaft member aligned on said coincident axes operative to transfer power from said transfer case means to said transmission, and torque reaction control means between said engine block and said transmission housing remote from said coincident axes operative to prevent relative rotation between said engine block and said transmission housing.

2. The combination recited in claim 1 wherein said intermediate drive means includes an intermediate shaft, means supporting said intermediate shaft within said spaced trunnions for rotation about said coincident engine power output and said transmission power input axes, means operative to transfer engine power from said transfer case means to said intermediate shaft, and means operative to transfer engine power from said intermediate shaft to said transmission.

3. The combination recited in claim 2 wherein said intermediate shaft supporting means includes means supported on one of said spaced trunnions defining an internal cylindrical bore aligned on said coincident engine power output and said transmission power input axes, means defining an outer cylindrical surface on said intermediate shaft slidably and rotatably journaled in said internal cylindrical bore whereby said intermediate shaft is rotatably supported on said one trunnion, an output gear supported on said transfer case means for rotation by said engine about said coincident engine power output and said transmission power input axes and including an internally splined bore therethrough aligned on said coincident axes, said intermediate shaft projecting through said splined bore, and means defining a plurality of external splines on said intermediate shaft slidably engaging said internal splines whereby said intermediate shaft is rotatable as a unit with said output gear and slidable relative thereto along said coincident engine power output and said transmission power input axes.

4. In an engine and transmission assembly including an engine having a block defining a primary rotating group axis and a transmission having a housing defining a drive output axis and a power input axis parallel thereto and laterally spaced therefrom and gear means in said transmission including an input gear aligned on said power input axis, the combination comprising, a transfer case rigidly attached to said engine block generally amidships thereof defining an engine power output axis parallel to said primary rotating group axis and laterally spaced therefrom, an output gear supported on said transfer case for rotation by said engine about said engine power output axis and with an internally splined bore therethrough aligned on said engine power output axis, means defining a pair of trunnions on said transfer case aligned on said engine power output axis, means defining a bore in one of said trunnions, means on said transmission housing defining a pair of spaced saddles aligned on said power input axis, respective ones of said trunnions being rotatably received in corresponding ones of said saddles so that said engine power output and said transmission power input axes coincide and said transmission housing is attached to said engine block for relative rotation about said coincident axes, an intermediate shaft defining an internal ring gear at one end thereof and an outer cylindrical surface at the other end thereof with a plurality of circumferential external splines intermediate said ends, said intermediate shaft being aligned on said coincident engine power output and said transmission power input axes and projecting through said output gear splined bore with said outer cylindrical surface being rotatably and slidably received in said trunnion bore and with said external splines slidably engaging said internal splines whereby said intermediate shaft is supported on said transfer case for rotation with said output gear and for bodily shiftable movement along said coincident engine power output and said transmission power input axes between an active position wherein said ring gear engages said transmission input gear for power transfer to said transmission and an inactive position wherein said ring gear is remote from said input gear, and torque reaction control means between said engine block and said transmission housing remote from said coincident engine power output and said transmission power input axes operative to prevent relative rotation therebetween.

* * * * *